(12) United States Patent
Wentink (10) Patent No.: US 7,742,443 B2
(45) Date of Patent: Jun. 22, 2010

(54) TRANSMIT POWER MANAGEMENT IN SHARED-COMMUNICATIONS CHANNEL NETWORKS

(76) Inventor: Maarten Menzo Wentink, Oudegracht 3A, 3511AB Utrecht (NL)

( * ) Notice: Subject to any disclaimer, the term of this patent is extended or adjusted under 35 U.S.C. 154(b) by 1228 days.

(21) Appl. No.: 10/377,324

(22) Filed: Feb. 28, 2003

(65) Prior Publication Data
US 2004/0029590 A1 Feb. 12, 2004

Related U.S. Application Data

(60) Provisional application No. 60/383,750, filed on May 28, 2002.

(51) Int. Cl.
*H04B 7/185* (2006.01)
*H04L 12/413* (2006.01)

(52) U.S. Cl. .................. 370/318; 370/332; 370/447; 455/69; 455/522

(58) Field of Classification Search ............ 370/338, 370/332, 349, 394, 401, 252, 327, 310, 315, 370/329, 330, 331, 333, 334, 341, 342, 345–350, 370/445–447; 455/450, 500, 67.13, 69, 522; 714/18, 749; 375/224, 227, 316, 324, 329
See application file for complete search history.

(56) References Cited

U.S. PATENT DOCUMENTS

| | | | | |
|---|---|---|---|---|
| 5,818,826 | A * | 10/1998 | Gfeller et al. | 370/342 |
| 6,643,469 | B1 * | 11/2003 | Gfeller et al. | 398/162 |
| 6,862,456 | B2 * | 3/2005 | Sugar et al. | 455/503 |
| 6,889,056 | B2 * | 5/2005 | Shibutani | 455/522 |
| 6,904,021 | B2 * | 6/2005 | Belcea | 370/252 |
| 6,941,113 | B2 * | 9/2005 | Asano | 455/73 |
| 7,009,957 | B2 * | 3/2006 | Wu et al. | 370/338 |
| 7,321,580 | B1 * | 1/2008 | Ramanathan et al. | 370/339 |
| 2002/0046379 | A1 * | 4/2002 | Miki et al. | 714/749 |
| 2002/0060997 | A1 * | 5/2002 | Hwang | 370/335 |
| 2002/0172186 | A1 * | 11/2002 | Larsson | 370/349 |
| 2002/0181492 | A1 * | 12/2002 | Kasami et al. | 370/445 |
| 2002/0191573 | A1 * | 12/2002 | Whitehill et al. | 370/338 |
| 2003/0012165 | A1 * | 1/2003 | Soomro et al. | 370/338 |
| 2003/0072280 | A1 * | 4/2003 | McFarland et al. | 370/332 |
| 2003/0128684 | A1 * | 7/2003 | Hirsch et al. | 370/338 |

FOREIGN PATENT DOCUMENTS

WO WO 03/007551 A 1/2003

OTHER PUBLICATIONS

Timothy Dimpsey, Christopher Langford, Robert Martin, James McChesney, "Evaluation of Adoptive Power Control Algorithims for A Hierarchical Packet radio Network", IEEE, pp. 341-347, 1996.*

(Continued)

*Primary Examiner*—Frank Duong
*Assistant Examiner*—Habte Mered
(74) *Attorney, Agent, or Firm*—McDonnell Boehnen Hulbert & Berghoff LLP (57) ABSTRACT

A method of ameliorating the hidden node problem in wireless local area networks employing power control is disclosed. The illustrative embodiments function in a variety of ways that have a common theme: while the Data Frames are transmitted at lesser potency, at least one of the control frames—Request-to-Send, Clear-to-Send, and Acknowledgement—associated with the Data Frame are sent at a greater potency. This causes at least one of the "loud" control frames to be heard and decoded by all of the potentially contending stations. And because the control frames carry duration information for the virtual carrier sense mechanism, their reception suppresses transmissions by potentially-contending stations that cannot sense the "quiet" Data Frames.

25 Claims, 9 Drawing Sheets

OTHER PUBLICATIONS

Mangold et al., "IEEE 802.11e Wireless LAN for Quality of Service", Proceedings of the European Wireless, Feb. 26, 2002, pp. 32-39, vol. 1, Florence.

Shankar et al., "QoS Signaling for Parameterized Traffic in IEEE 802.11e Wireless LANs", Lecture Notes in Computer Science, Aug. 1, 2002, pp. 67-83, vol. 2402, Springer Verlag.

* cited by examiner

FIG. 12

TRANSMIT POWER MANAGEMENT IN SHARED-COMMUNICATIONS CHANNEL NETWORKS

REFERENCE TO RELATED APPLICATIONS

This application claims the benefit of:

1. U.S. Provisional Application No. 60/383,750, filed on May 28, 2002, entitled "Method of Optimizing Transmit Power for EDCF Based Wireless Networks,"

which is also incorporated by reference.

The following U.S. patent applications are incorporated by reference:

2. U.S. patent application Ser. No. 10/377,323, filed on Feb. 28, 2003, entitled "Embedding Class of Service Information in MAC Control Frames," and 3. U.S. patent application Ser. No. 10/353,391, filed on Jan. 29, 2003, entitled "Direct Link Protocol in Wireless Area Networks."

FIELD OF THE INVENTION

The present invention relates to telecommunications in general, and, more particularly, to a technique for power management in networks that communicate via a shared-communications channel.

BACKGROUND OF THE INVENTION

Figure 1:
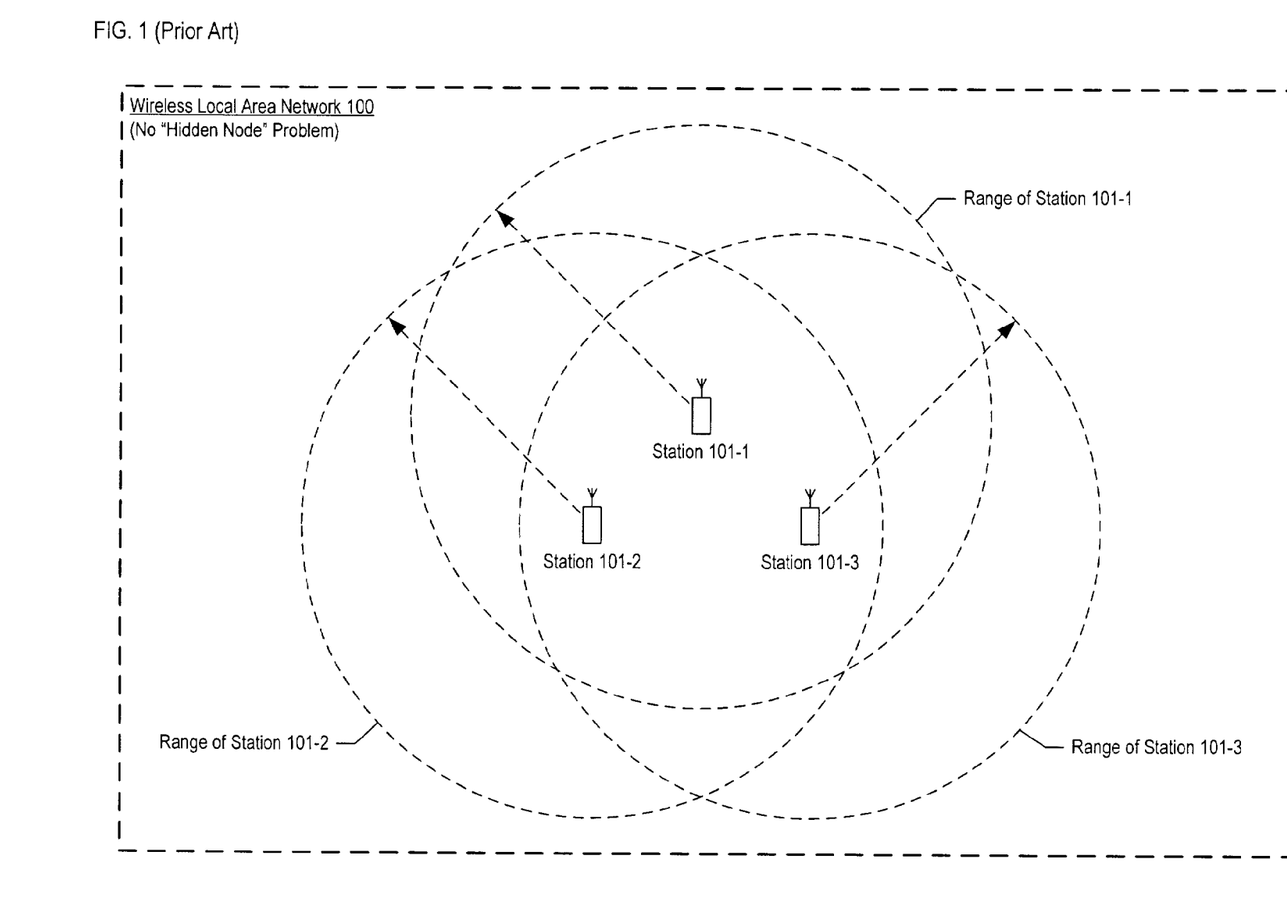
FIG. 1 depicts a schematic diagram of a local area network in the prior art in which there is no "hidden" node problem.

FIG. 1 depicts a schematic diagram of an IEEE 802.11-compliant wireless local area network, which comprises: station 101-1, station 101-2, which is an access point, and station 101-3. The communications between station 101-1, station 101-2, and station 101-3 occur within a shared-communications channel, and, therefore, a medium access control protocol is used to allocate usage of the channel among the stations.

In accordance with the IEEE 802.11 standard, one medium access control protocol used by the stations is carrier sense multiple access. In accordance with carrier sense multiple access, a station desiring to transmit a frame first listens to the channel and transmits only when it fails to sense another transmission.

For the purposes of this specification, the "potency" of a transmitted frame is defined as the effective spatial reach of the transmitted frame. As is well-known to those skilled in the art, the potency of a frame can be adjusted by the transmitter and is affected by the energy per bit at which the frame is transmitted. When, as in FIG. 1, each station is within the transmission range of every other station, carrier sense multiple access works well. In contrast, when every station is not within transmission range of every other station, as in FIG. 2, carrier sense multiple access might not work as well. For example, when station 201-1 transmits a Frame, station 201-3 will not sense it, and, therefore, might begin a transmission that prevents station 201-2 from correctly receiving either transmission. This is known as the "hidden" node problem.

Figure 2:
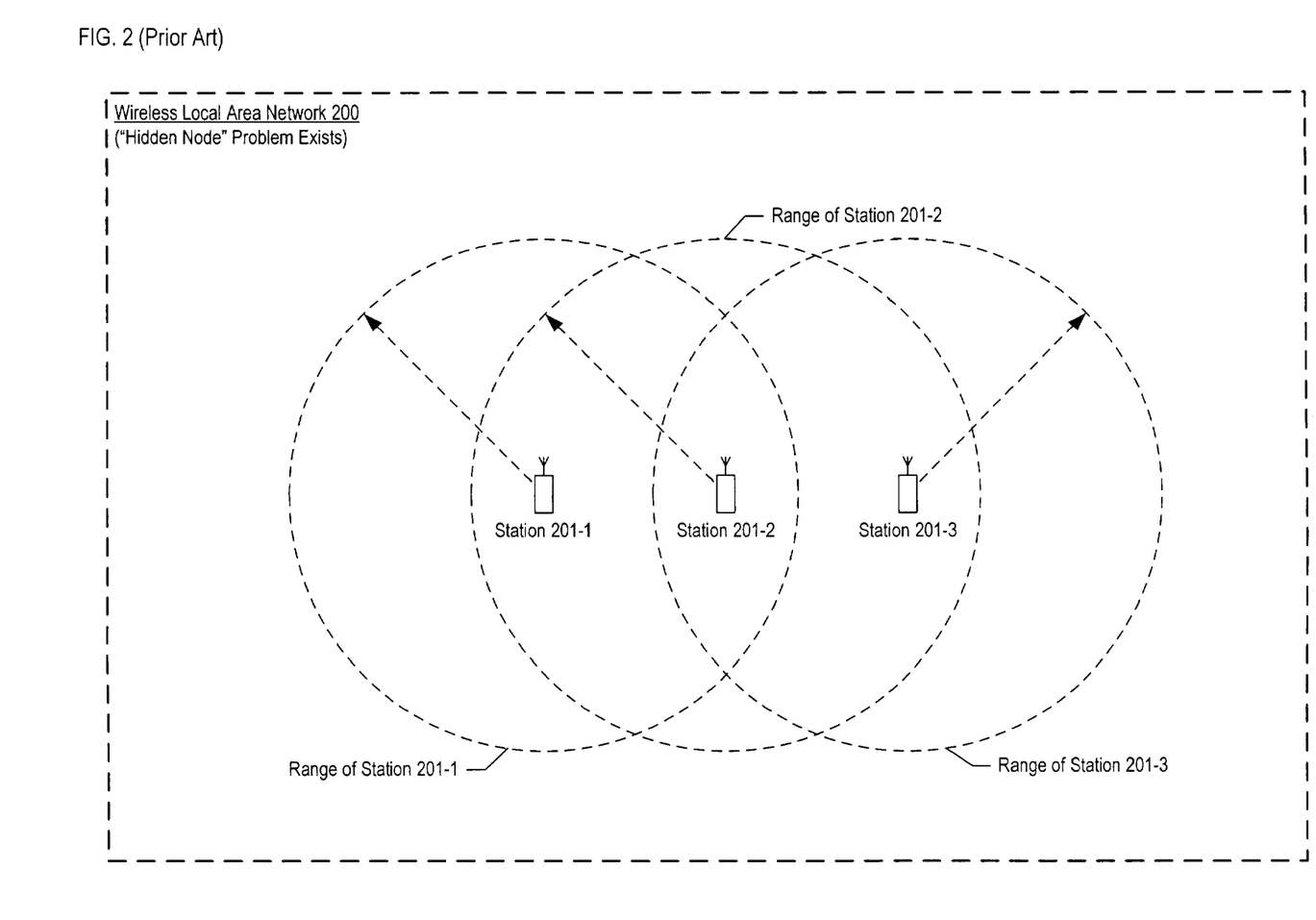
FIG. 2 depicts a schematic diagram of a local area network in the prior art in which there is a hidden node problem.
Figure 3:
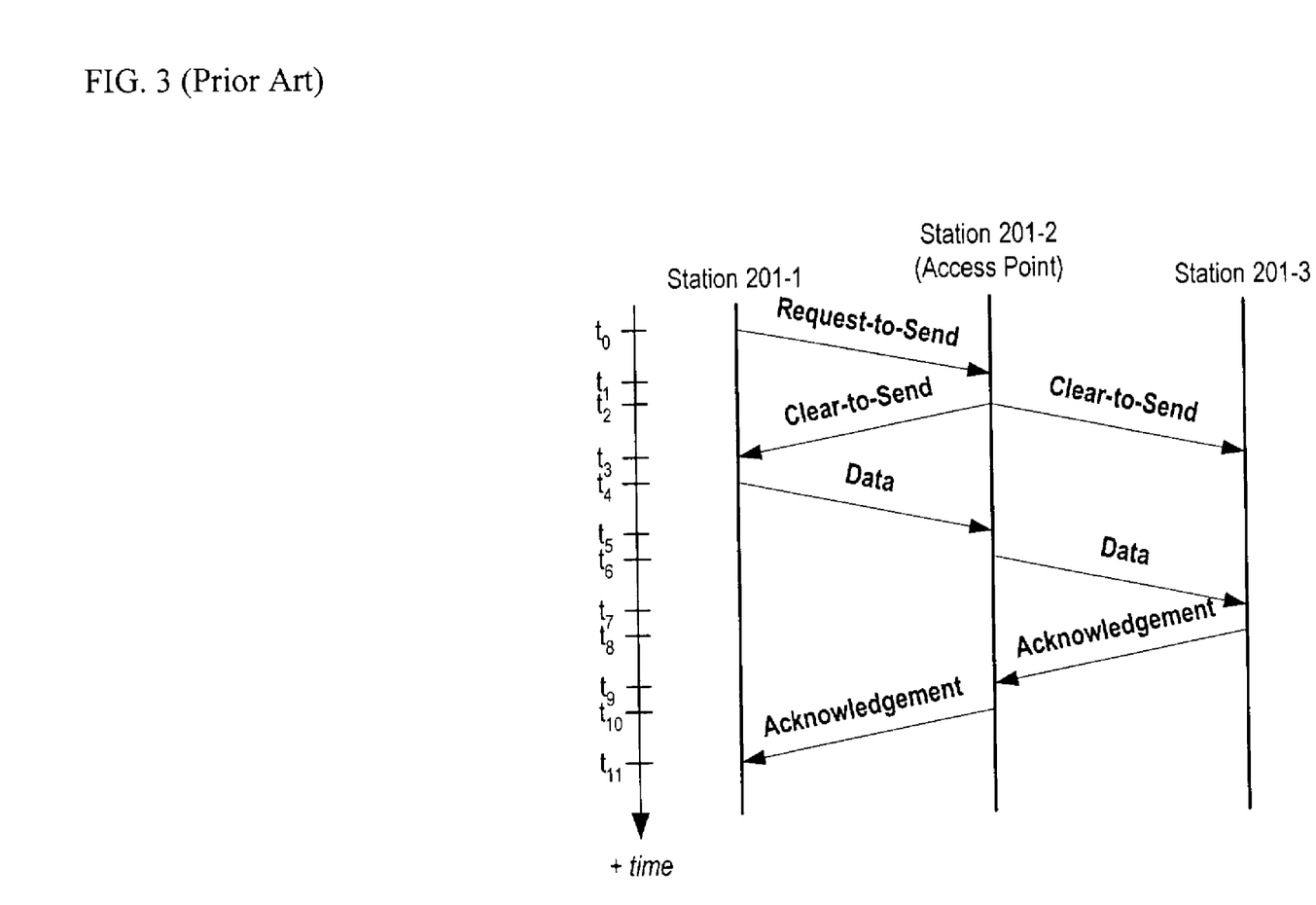
FIG. 3 depicts the message flows associated with the Request-to-Send/Clear-to-Send mechanism for addressing the hidden node problem in FIG. 2.

The IEEE 802.11 standard addresses the hidden node problem with a mechanism known as Request-to-Send/Clear-to-Send. The message flow associated with the Request-to-Send/Clear-to-Send mechanism is depicted in FIG. 3.

In accordance with the Request-to-Send/Clear-to-Send mechanism, station 201-1 sends a Request-to-Send Frame at time $t_0$ to all of the stations within its transmission range (i.e., station 201-2). The Request-to-Send Frame contains a duration value that extends through the duration of the Clear-to-Send Frame and any Data and Acknowledgement Frames that station 201-1 expects will be transmitted as part of its request. All of the stations within the transmission range of station 201-1 receive and decode the Request-to-Send Frame to recover the value in the duration field. The value in the duration field is then used to populate a timer, called the Network Allocation Vector, which indicates how long those stations are to refrain from transmitting, regardless of whether they sense a transmission in the channel or not.

In response to the receipt of the Request-to-Send Frame, station 201-2 transmits a Clear-to-Send Frame at time $t_2$ to all of the stations within its transmission range (i.e., station 201-1 and station 201-3). The Clear-to-Send Frame contains a duration value that extends through the duration of any Data and Acknowledgement Frames that station 201-1 desires to transmit. All of the stations within the transmission range of station 201-2 receive and decode the Request-to-Send Frame to recover the value in the duration field. The value in the duration field is then used to populate their Network Allocation Vector.

In this way, the Request-to-Send/Clear-to-Send mechanism addresses the hidden node problem by ensuring that station 201-3 will not transmit while station 201-1 is transmitting its Data Frame to station 201-2.

SUMMARY OF THE INVENTION

Some IEEE 802.11 compliant stations transmit their frames at a fixed level of potency. In contrast, some IEEE 802.11 compliant stations (e.g., 802.11(h) compliant stations, etc.) can adjust the potency of their transmitted frames. The stations that can adjust the potency of their transmitted frames are advantageous because they can conserve energy in contrast to stations that cannot adjust the potency of their transmitted frames. The conservation of energy is particularly advantageous for battery-powered stations such as notebook computers, personal digital assistants, and digital cameras.

In general, the stations that can adjust the potency of their transmitted frames must balance two competing goals:

(1) the potency must be sufficient to ensure that the intended recipient of the frame can receive the frame, and (2) the potency should be as small as possible so as to conserve as much energy as possible.

An unintended and disadvantageous consequence of having a station decrease the potency of its transmitted frames is that it increases the likelihood that a hidden node might exist. In other words, as a station reduces the potency of its transmitted frames, it increases the likelihood that its transmissions will not be sensed by another station, and, therefore, becomes a hidden node.

To overcome this problem, the illustrative embodiment transmits Data Frames with a different level of potency that one or more of the medium access control ("MAC") control frames Request-to-Send, Clear-to-Send, and Acknowledgement Frames associated with the Data Frame. In particular, while the Data Frames are transmitted with lesser potency, one or more of the medium access control ("MAC") control frames Request-to-Send, Clear-to-Send, and Acknowledgement Frames associated with the Data Frame are transmitted with greater potency.

In accordance with the illustrative embodiment of the present invention, the potency of a transmitted frame is affected by:

i. the energy per bit of the frame, or ii. the length of the frame, or iii. any combination of i and ii.

In particular, frames with fewer bits are more potent than frames with more bits because the probability of receiving a frame with a bit error increases with the number of bits in the frame.

Furthermore, in accordance with the illustrative embodiment of the present invention, the energy per bit of a frame is affected by:

i. the radiated average power level, or
  ii. the bit rate, or
  iii. the coding rate, or
  iv. any combination of i, ii, and iii.

It will be clear to those skilled in the art how each of these factors affects the energy per bit of a frame and how each of these factors affects the rate at which the transmitter consumes energy.

Even though the illustrative embodiments cause some or all of the control frames to be transmitted with greater potency than they might otherwise be, many of the embodiments will still consume, on average, less energy than stations that transmit both data and control frames at a fixed level of potency.

Some embodiments of the present invention are useful when an access point relays Data Frames between the source and destination stations, and some embodiments are useful when the access point does not relay Data Frames (e.g., when the stations communicate directly in accordance with the direct link protocol, etc.). U.S. patent application Ser. No. 10/353,391, entitled "Direct Link Protocol in Wireless Area Networks," teaches a direct link protocol.

The illustrative embodiment of the present invention comprises: wirelessly receiving a first Data Frame via a shared-communications channel, wherein said first Data Frame was transmitted with a first potency; and wirelessly transmitting a first Acknowledgement Frame into said shared-communications channel at a second potency, wherein said first Acknowledgement Frame is transmitted in response to the receipt of said first Data Frame; wherein said second potency is higher than said first potency.

DETAILED DESCRIPTION

Figure 4:
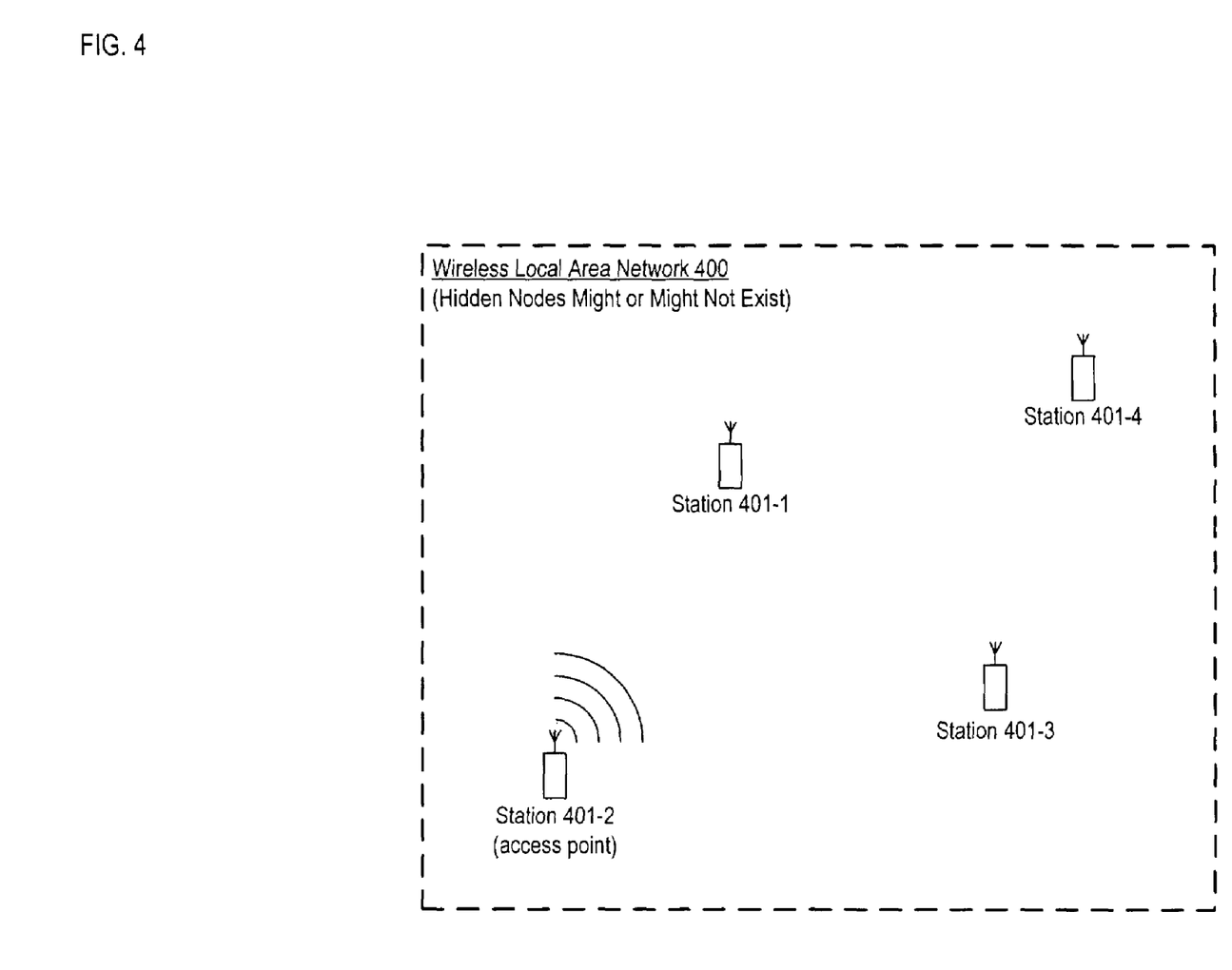
FIG. 4 depicts a schematic diagram of a local area network in accordance with the illustrative embodiments of the present invention.

FIG. 4 depicts a schematic diagram of local area network 400 in accordance with the illustrative embodiments of the present invention. Local area network 400 comprises a plurality of stations, station 401-1 through 401-3, that communicate wirelessly via a shared-communications channel. In accordance with the illustrative embodiment, all of the stations in the network operate in compliance with the IEEE 802.11 standard.

Figure 5:
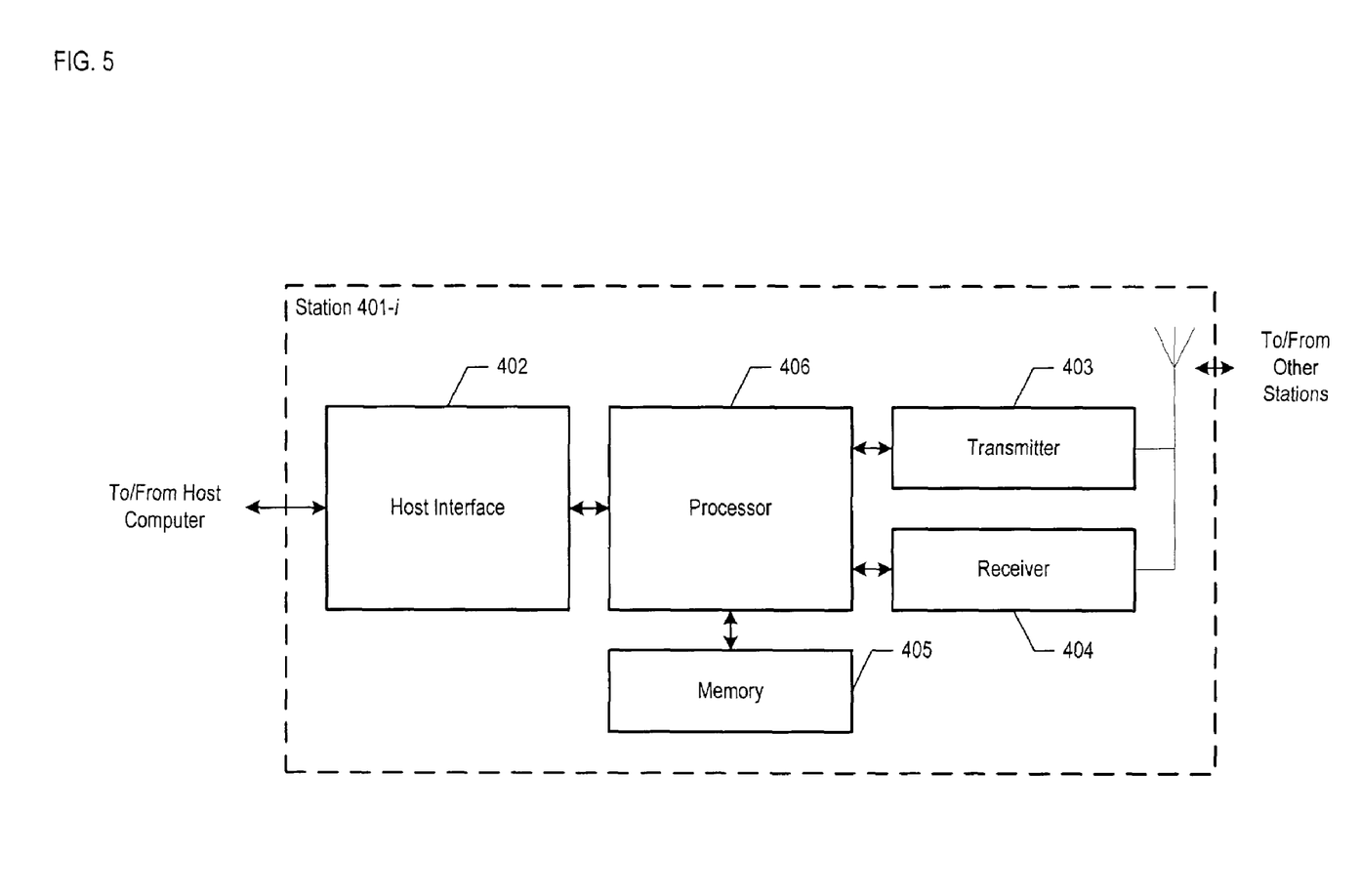
FIG. 5 depicts a block diagram of the salient components in a station in accordance with the illustrative embodiments of the present invention.

FIG. 5 depicts a block diagram of the salient components of station 401-$i$, for i=1 to 4, in accordance with illustrative embodiments of the present invention. Station 401-$i$ is one station in an IEEE 802.11-compliant wireless local area network, and, therefore all of the Frames are transmitted by all of the stations in the network in compliance with the IEEE 802.11 standard. It will be clear to those skilled in the art, however, after reading this disclosure, how to make and use embodiments of the present invention that operate in a non-IEEE 802.11 compliant network.

Throughout the course of each of the illustrative embodiments, stations 401-1 through 401-4 are deemed to be stationery and the radio frequency environment stable. It will be clear to those skilled in the art, after reading this disclosure, how to make and use embodiments of the present invention that operate in a network in which one or more of the stations move during the course of an atomic operation or in which the radio frequency environment changes during the course of an atomic operation or both.

Station 401-$i$ comprises: processor 406, host interface 402, transmitter 403, receiver 404, and memory 405, interconnected as shown. Station 401-$i$ is fabricated on one or more integrated circuits and interfaces with a host computer (not shown) and an antenna (not shown) in well-known fashion.

Processor 406 is a general-purpose processor that is capable of executing instructions stored in memory 405, of reading data from and writing data into memory 405, and of executing the tasks described below and with respect to FIGS. 6 through 13. In some alternative embodiments of the present invention, processor 406 is a special-purpose processor. In either case, it will be clear to those skilled in the art, after reading this disclosure, how to make and use processor 406.

Host interface 402 is a circuit that is capable of receiving data and instructions from a host computer (not shown) and of relaying them to processor 406. Furthermore, host interface 402 is capable of receiving data and instructions from processor 406 and relaying them to the host computer. It will be clear to those skilled in the art how to make and use host interface 402.

Transmitter 403 is a hybrid analog and digital circuit that is capable of receiving frames from processor 406 and of transmitting them into the shared-communications channel at times in accordance with IEEE 802.11. It will be clear to those skilled in the art, after reading this disclosure, how to make and use transmitter 403.

Receiver 404 is a hybrid analog and digital circuit that is capable of receiving frames from the shared-communications channel and relaying them to processor 406. It will be clear to those skilled in the art, after reading this disclosure, how to make and use receiver 404.

Memory 405 is a non-volatile random-access memory that stored instructions and data For processor 406. It will be clear to those skilled in the art how to make and use memory 405.

FIGS. 6 through 13 depict message flows in accordance with various embodiments of the present invention. In each figure, the formatting of the text of the name of a Frame indicates how the Frame is transmitted. The styles of text and their meaning is described in Table 1.

TABLE 1

Character of Frames Transmitted in Accordance with the Illustrative Embodiments of the Present Invention

| | |
|---|---|
| *Frame* | italics denotes a Frame that is transmitted to the access point at lesser potency. |
| Frame | bold denotes a Frame that is transmitted at greater potency. |
| Frame | no emphasis denotes a Frame that is transmitted to the desire peer station at lesser potency. |
| <u>Frame</u> | underline denotes a Frame that is transmitted from one peer to another peer station without being relayed by an access point (i.e., as part of a direct link stream). |

In all of the embodiments, the Request-to-Send, Clear-to-Send, Data, and Acknowledgement Frames comprise a value equal to the remainder of the atomic operation. This enables all of the stations that hear any of these frames to set their Network Allocation Vectors so that even if they can't physically sense the following frames (i.e., are hidden from station 401-1), their virtual carrier sense mechanism will prevent their transmitting onto them.

In accordance with the illustrative embodiments, the Request-to-Send and Clear-to-Send Frames are sent at the same low bit rate, and the Data and Acknowledgement Frames are generally sent the highest possible bit rate that results in an acceptable probability of being received correctly. It will be clear to those skilled in the art how to make and use embodiments of the present invention in which the bit rates of the various frames are sent at different bit rates than in the illustrative embodiments.

Figure 6:
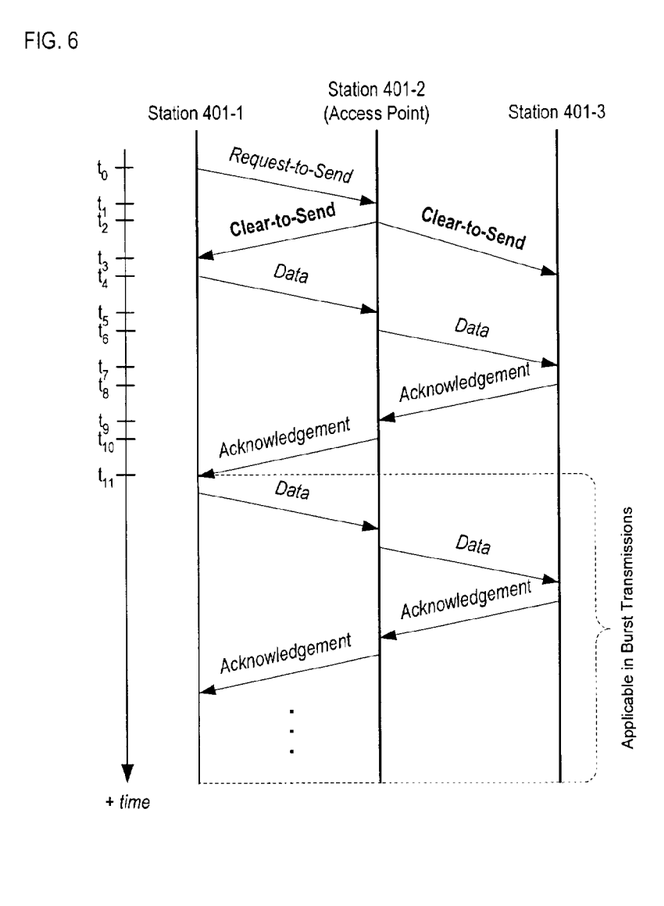
FIG. 6 depicts the message flows associated with the first illustrative embodiment of the present invention.

FIG. 6 depicts the message flows in the first illustrative embodiment of the present invention. In accordance with the first illustrative embodiment of the present invention, station 401-2 (the access point) is involved in the transmission and reception of all of the Request-to-Send, Clear-to-Send, Data, and Acknowledgement Frames.

At time $t_0$, station 401-1 transmits a Request-to-Send Frame to station 401-2 at a first potency. The Request-to-Send Frame is received by station 401-2 at time $t_1$.

At time $t_2$, station 401-2 transmits a Clear-to-Send Frame at a second potency. The second potency is higher than the first potency. The Clear-to-Send Frame is received at time $t_3$.

At time $t_4$, station 401-1 transmits a Data Frame to station 401-2 at a third potency. The Data Frame is received by station 401-2 at time $t_5$. The third potency is equal to the first potency and less than the second potency.

At time $t_6$, station 401-2 re-transmits the Data Frame to station 401-3 at a fourth potency. The Data Frame is received by station 401-3 at time $t_7$.

At time $t_8$, station 401-3 transmits an Acknowledgement Frame to station 401-2 at a fifth potency, in response to the receipt of the Data Frame. The fifth potency is equal to the fourth potency and less than the second potency. The Acknowledgement Frame is received by station 401-2 at time $t_9$.

At time $t_{10}$, station 401-2 re-transmits the Acknowledgement Frame to station 401-1 at a sixth potency. The sixth potency is equal to the first and third potency and less than the second potency. The Acknowledgement Frame is received by station 401-1, in response to the receipt of the Data Frame, at time $t_{11}$.

After time $t_{11}$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

Figure 7:
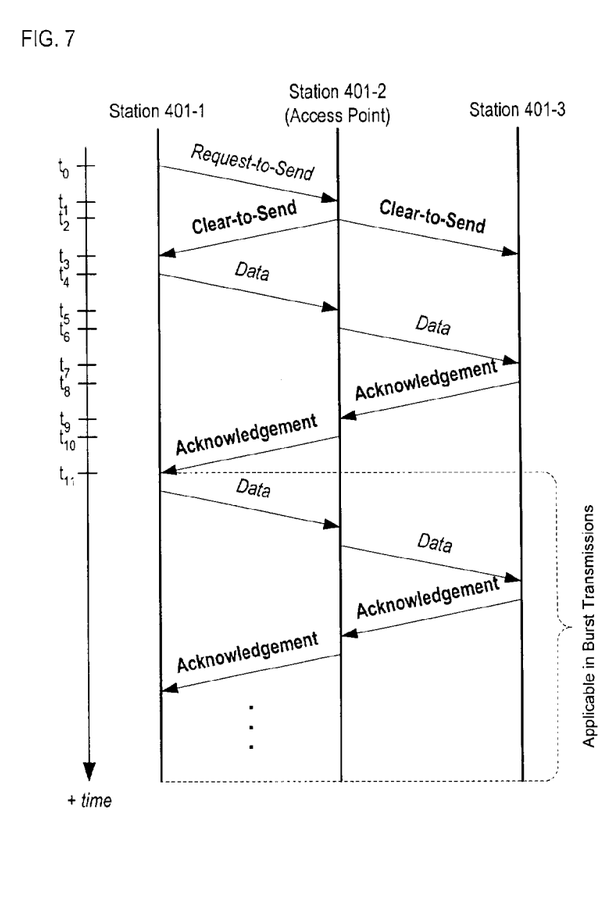
FIG. 7 depicts the message flows associated with the second illustrative embodiment of the present invention.

FIG. 7 depicts the message flows in the second illustrative embodiment of the present invention. In accordance with the second illustrative embodiment of the present invention, station 401-2 (the access point) is involved in the transmission and reception of all of the Request-to-Send, Clear-to-Send, Data, and Acknowledgement Frames.

At time $t_0$, station 401-1 transmits a Request-to-Send Frame to station 401-2 at a first potency. The Request-to-Send Frame is received by station 401-2 at time $t_1$.

At time $t_2$, station 401-2 transmits a Clear-to-Send Frame at a second potency. The second potency is higher than the first potency. The Clear-to-Send Frame is received at time $t_3$.

At time $t_4$, station 401-1 transmits a Data Frame to station 401-2 at a third potency. The Data Frame is received by station 401-2 at time $t_5$. The third potency is equal to the first potency and less than the second potency.

At time $t_6$, station 401-2 re-transmits the Data Frame to station 401-3 at a fourth potency. The Data Frame is received by station 401-3 at time $t_7$.

At time $t_8$, station 401-3 transmits an Acknowledgement Frame to station 401-2 at a fifth potency, in response to the receipt of the Data Frame The fifth potency is higher than the fourth potency and equal to the second potency. The Acknowledgement Frame is received by station 401-2 at time $t_9$.

At time $t_{10}$, station 401-2 re-transmits the Acknowledgement Frame to station 401-1 at a sixth potency. The sixth potency is higher than the first and third potency and equal to the second potency. The Acknowledgement Frame is received by station 401-1, in response to the receipt of the Data Frame, at time $t_{11}$.

After time $t_{11}$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

Figure 8:
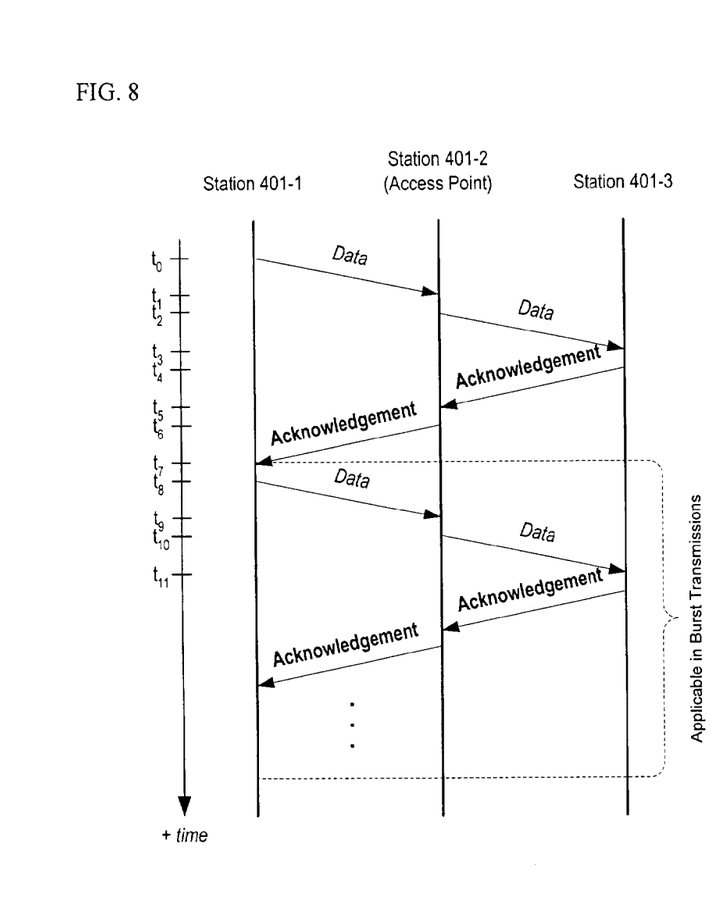
FIG. 8 depicts the message flows associated with the third illustrative embodiment of the present invention.

FIG. 8 depicts the message flows in the third illustrative embodiment of the present invention. In accordance with the third illustrative embodiment of the present invention, station 401-2 (the access point) is involved in the transmission and reception of all of the Data and Acknowledgement Frames. In accordance with the third illustrative embodiment, there are no transmitted Request-to-Send Frames or Clear-to-Send Frames. This is particularly useful when the first Data Frame of a contention free burst is a short frame because both the Data Frames and the Acknowledgement Frames convey the duration information for the remainder of the burst.

At time $t_0$, station 401-1 transmits a Data Frame to station 401-2 at a first potency. The Data Frame is received by station 401-2 at time $t_1$.

At time $t_2$, station 401-2 re-transmits the Data Frame to station 401-3 at a second potency. The Data Frame is received by station 401-3 at time $t_3$.

At time $t_4$, station 401-3 transmits an Acknowledgement Frame to station 401-2 at a third potency, in response to the receipt of the Data Frame The third potency is higher than the second potency. The Acknowledgement Frame is received by station 401-2 at time $t_5$.

At time $t_6$, station 401-2 re-transmits the Acknowledgement Frame to station 401-1 at a fourth potency. The fourth potency is higher than the first potency. The Acknowledgement Frame is received by station 401-1, in response to the transmission of the Data Frame, at time $t_7$.

After time $t_8$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

Figure 9:
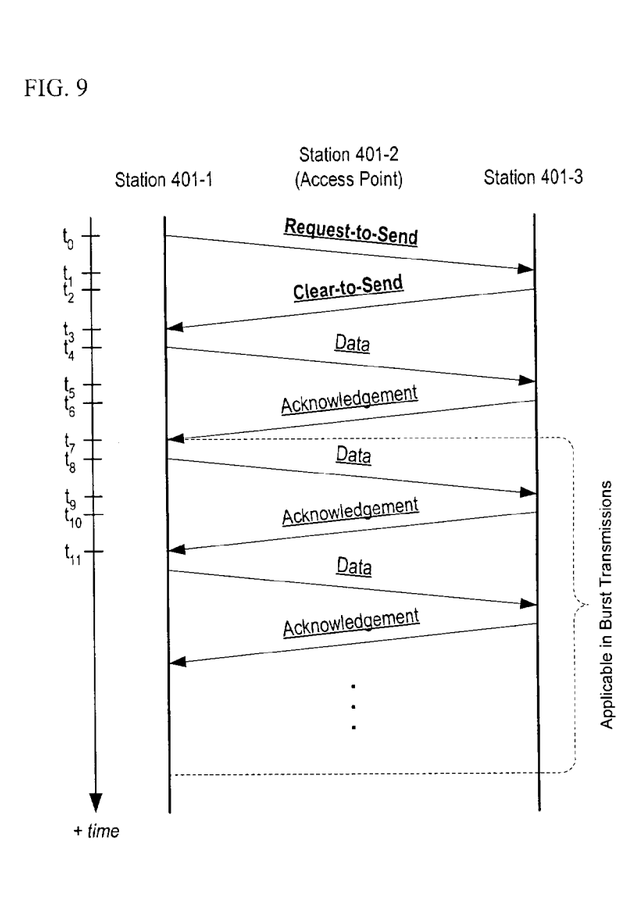
FIG. 9 depicts the message flows associated with the fourth illustrative embodiment of the present invention.

FIG. 9 depicts the message flows in the fourth illustrative embodiment of the present invention. In accordance with the fourth illustrative embodiment, station 401-1 and station 401-3 communicate directly and without station 401-2.

At time $t_0$, station 401-1 transmits a Request-to-Send Frame to station 401-3 at a first potency. The Request-to-Send Frame is received by station 401-3 at time $t_1$.

At time $t_2$, station 401-3 transmits a Clear-to-Send Frame at a second potency. The Clear-to-Send Frame is received by station 401-1 at time $t_3$.

At time $t_4$, station 401-1 transmits a Data Frame to station 401-3 at a third potency. The Data Frame is received by station 401-3 at time $t_5$. The third potency is lower than to the first potency.

At time $t_6$, station 401-3 transmits an Acknowledgement Frame to station 401-2 at a fourth potency, in response to the receipt of the Data Frame. The Acknowledgement Frame is received by station 401-3 at time $t_7$. The fourth potency is less than the first potency and the second potency and equal to the third potency.

After time $t_{11}$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

Figure 10:
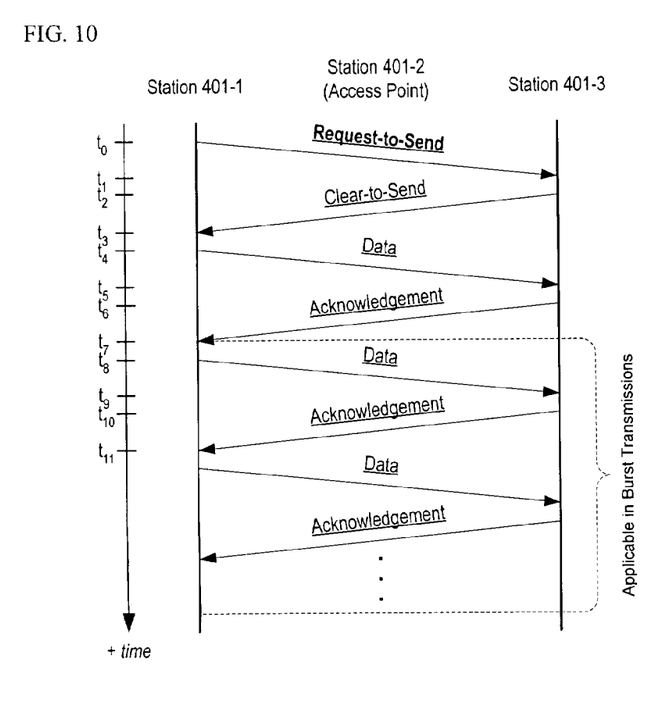
FIG. 10 depicts the message flows associated with the fifth illustrative embodiment of the present invention.

FIG. 10 depicts the message flows in the fifth illustrative embodiment of the present invention. In accordance with the fifth illustrative embodiment, station 401-1 and station 401-3 communicate directly and without station 401-2.

At time $t_0$, station 401-1 transmits a Request-to-Send Frame to station 401-3 at a first potency. The Request-to-Send Frame is received by station 401-3 at time $t_1$.

At time $t_2$, station 401-3 transmits a Clear-to-Send Frame at a second potency. The second potency is lower than the first potency. The Clear-to-Send Frame is received by station 401-1 at time $t_3$.

At time $t_4$, station 401-1 transmits a Data Frame to station 401-3 at a third potency. The Data Frame is received by station 401-3 at time $t_5$. The third potency is lower than to the first potency and equal to the second potency.

At time $t_6$, station 401-3 transmits an Acknowledgement Frame to station 401-2 at a fourth potency, in response to the receipt of the Data Frame. The Acknowledgement Frame is received by station 401-3 at time $t_7$. The fourth potency is less than the first potency and equal to the second and third potency.

After time $t_{11}$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

Figure 11:
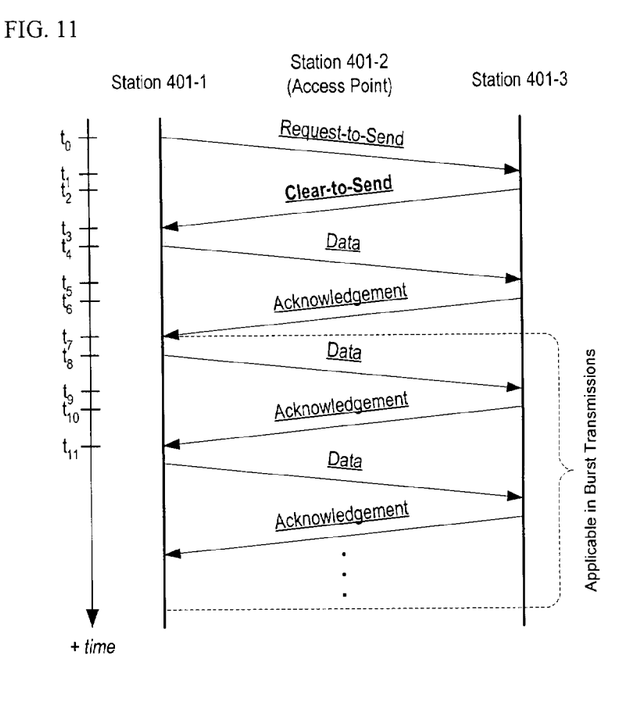
FIG. 11 depicts the message flows associated with the sixth illustrative embodiment of the present invention.

FIG. 11 depicts the message flows in a sixth illustrative embodiment of the present invention. In accordance with the sixth illustrative embodiment, station 401-1 and station 401-3 communicate directly and without station 401-2.

At time $t_0$, station 401-1 transmits a Request-to-Send Frame to station 401-3 at a first potency. The Request-to-Send Frame is received by station 401-3 at time $t_1$.

At time $t_2$, station 401-3 transmits a Clear-to-Send Frame at a second potency. The second potency is higher than the first signal to noise ratio. The Clear-to-Send Frame is received by station 401-1 at time $t_3$.

At time $t_4$, station 401-1 transmits a Data Frame to station 401-3 at a third potency. The Data Frame is received by station 401-3 at time $t_5$. The third potency is equal to the first potency and lower than the second potency.

At time $t_6$, station 401-3 transmits an Acknowledgement Frame to station 401-2 at a fourth potency, in response to the receipt of the Data Frame. The Acknowledgement Frame is received by station 401-3 at time $t_7$. The fourth potency is less than the second potency and equal to the first and third potencies.

After time $t_{11}$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

Figure 12:
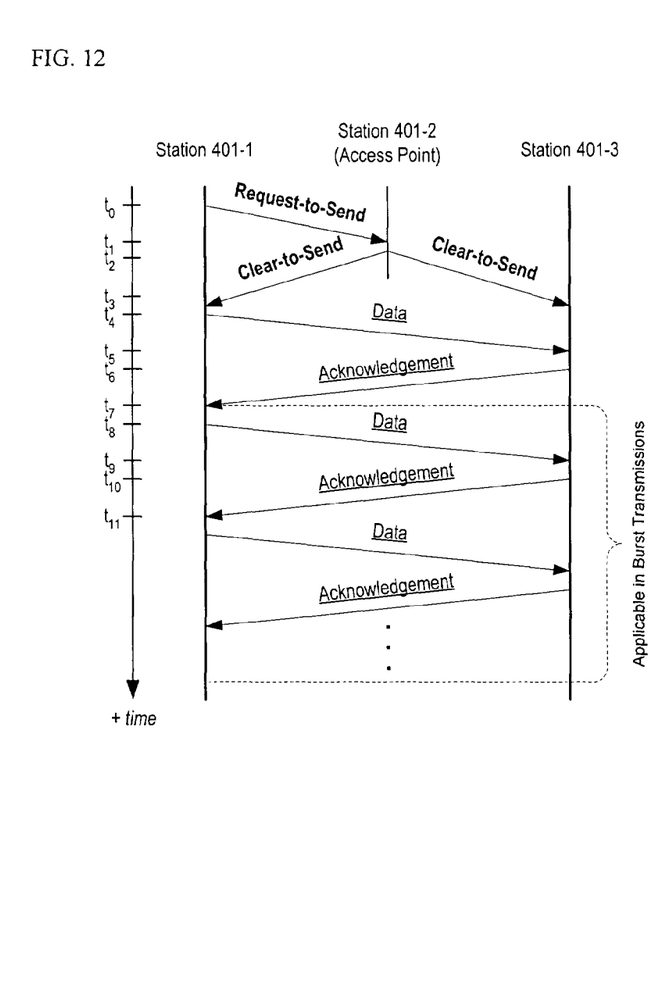
FIG. 12 depicts the message flows associated with the seventh illustrative embodiment of the present invention.

FIG. 12 depicts the message flows in a seventh illustrative embodiment of the present invention. In accordance with the fourth illustrative embodiment, station 401-2 is involved in the Request-to-Send and Clear-to-Send Frame flow, but stations 401-1 and 401-3 transmit the Data and Acknowledgement Frames directly and without station 401-2.

At time $t_0$, station 401-1 transmits a Request-to-Send Frame to station 401-2 at a first potency. The Request-to-Send Frame is received by station 401-2 at time $t_1$.

At time $t_2$, station 401-2 transmits a Clear-to-Send Frame at a second signal-to-noise. The second potency is equal to the first potency. The Clear-to-Send Frame is received by station 401-1 and station 401-2 at time $t_3$.

At time $t_4$, station 401-1 transmits a Data Frame to station 401-3 at a third potency, which is received by station 401-3 at time $t_5$. The third potency is lower than the first potency.

At time $t_6$, station 401-3 transmits an Acknowledgement Frame to station 401-2 at a fourth potency, in response to the receipt of the Data Frame. The fourth potency is equal to the third potency. The Acknowledgement Frame is received by station 401-3 at time $t_7$ in response to the transmission of the Data Frame.

After time $t_7$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

Figure 13:
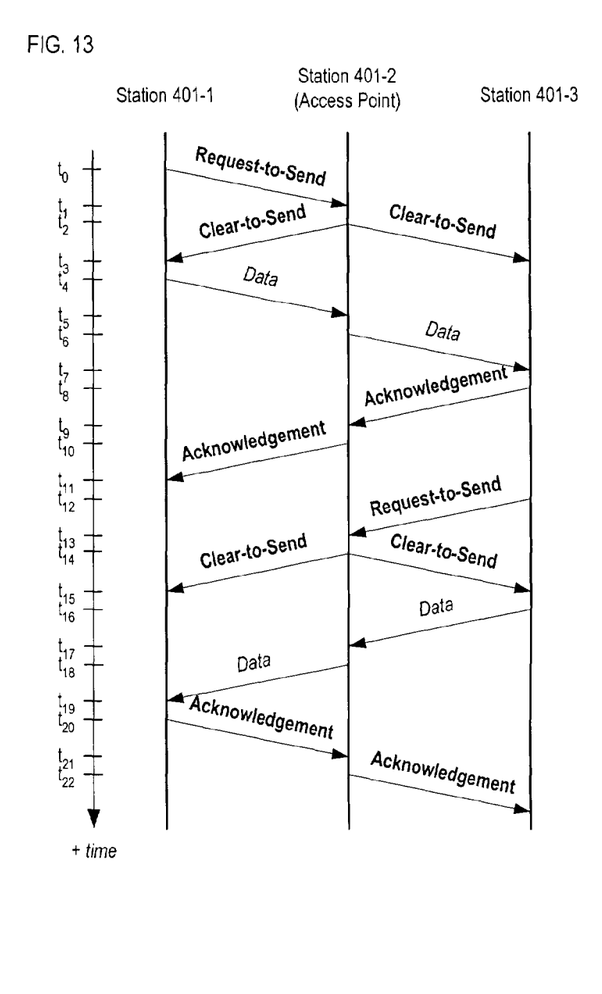
FIG. 13 depicts the message flows associated with the eighth illustrative embodiment of the present invention.

FIG. 13 depicts the message flows in the eighth illustrative embodiment of the present invention. In accordance with the first illustrative embodiment of the present invention, station 401-2 (the access point) is all involved in the transmission and reception of the Request-to-Send, Clear-to-Send, data, and Acknowledgement Frames. First, station 401-1 transmits a Data Frame to station 401-3 via station 401-2, and then station 401-3 transmits a Data Frame to station 401-1. The point of this illustrative embodiment is to show the symmetry associated with the transmission of Data Frames.

At time $t_0$, station 401-1 transmits a Request-to-Send Frame to station 401-2 at a first potency. The Request-to-Send Frame is received by station 401-2 at time $t_1$.

At time $t_2$, station 401-2 transmits a Clear-to-Send Frame at a second potency. The Clear-to-Send Frame is received at time $t_3$.

At time $t_4$, station 401-1 transmits a Data Frame to station 401-2 at a third potency, which is received by station 401-2 at time $t_5$. The third potency is less than the first potency.

At time $t_6$, station 401-2 re-transmits the Data Frame to station 401-3 at a fourth potency The fourth potency is less than the second potency. The Data Frame is received by station 401-3 at time $t_7$.

At time $t_8$, station 401-3 transmits an Acknowledgement Frame to station 401-2 at a fifth potency, in response to the receipt of the Data Frame. The Acknowledgement Frame is received by station 401-2 at time $t_9$. The fifth potency is higher than the fourth potency.

At time $t_{10}$, station 401-2 re-transmits the Acknowledgement Frame to station 401-1 at a sixth potency. The Acknowledgement Frame is received by station 401-1 at time $t_{11}$. The sixth potency is higher than the third potency.

After time $t_{11}$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

At time $t_{12}$, station 401-3 transmits a Request-to-Send Frame to station 401-2 at a seventh potency. The Request-to-Send Frame is received by station 401-2 at time $t_{13}$. The seventh potency equals the fifth potency.

At time $t_{14}$, station 401-2 transmits a Clear-to-Send Frame at a eighth potency. The eighth potency is equal to the second potency. The Clear-to-Send Frame is received at time $t_{15}$.

At time $t_{16}$, station 401-3 transmits a Data Frame to station 401-2 at a ninth potency. The Data Frame is received by station 401-2 at time $t_{17}$. The ninth potency is equal to the fourth potency and less than the fifth and seventh potencies.

At time $t_{18}$, station 401-2 re-transmits the Data Frame to station 401-1 at a tenth potency. The Data Frame is received by station 401-1 at time $t_{19}$. The tenth potency is equal to the third potency and less than the first and sixth potencies.

At time $t_{20}$, station 401-1 transmits an Acknowledgement Frame to station 401-2 at an eleventh potency, in response to the receipt of the Data Frame. The Acknowledgement Frame is received by station 401-2 at time $t_{21}$. The eleventh potency is higher than the third and tenth potencies and equal to the first and sixth potencies.

At time $t_{21}$, station 401-2 re-transmits the Acknowledgement Frame to station 401-3 at a twelfth potency. The Acknowledgement Frame is received by station 401-1 at time $t_{22}$. The twelfth potency is higher than the fourth and ninth potencies and equal to the fifth and seventh potencies.

After time $t_{22}$, the network allocation vector in all of the stations that received any frame in the process will have expired, and, therefore contention for the shared-communications channel can resume in well-known fashion unless more Data Frames are to be transmitted as part of a contention free burst. In the case of a contention free burst, the second and subsequent Data Frames are protected when stations 401-1, 401-2, and 401-3 transmit a frame containing the duration of the remainder of the burst. It will be clear to those skilled in the art how to make and use embodiments of the present invention that accommodate contention free bursts.

It is to be understood that the above-described embodiments are merely illustrative of the present invention and that many variations of the above-described embodiments can be devised by those skilled in the art without departing from the scope of the present invention. It is therefore intended that such variations be included within the scope of the following claims and their equivalents.

What is claimed is:

1. A method for transmitting data in a wireless network comprising:

transmitting from a station a request-to-send (RTS) frame at a first potency, wherein the first potency is determinable, based at least in part on, a first bit rate and a first radiated power level;

receiving at the station a clear-to-send (CTS) frame in response to the RTS frame, wherein the CTS frame has a second potency determinable, based at least in part on, a second bit rate and a second radiated power level;

transmitting from the station a data frame in response to the CTS frame, wherein the data frame is transmitted at a third potency determinable, based at least in part on, a third bit rate and a third radiated power level; and     receiving at the station an acknowledgment frame as a response to the data frame, wherein the acknowledgment frame has a fourth potency determinable, based at least in part on, a fourth bit rate, a fourth radiated power level, and a frame size of the acknowledgement frame,     wherein at least one of the first potency, the second potency, and the fourth potency is greater than the third potency, and wherein the third bit rate is greater than at least one of the first bit rate and the second bit rate.

2. The method of claim 1, wherein only the first potency is greater than the third potency and the RTS frame is transmitted to every network station.

3. The method of claim 1, wherein only the second potency is greater than the third potency and the CTS frame is transmitted to every network station.

4. The method of claim 1, wherein only the fourth potency is greater than the third potency and the acknowledgment frame is transmitted to every network station.

5. The method of claim 1, further comprising:
transmitting one or more additional data frames at the third potency; and
receiving one or more additional acknowledgment frames at the fourth potency, wherein each of the one or more additional acknowledgment frames is a response to each of the one or more additional data frames.

6. The method of claim 1, wherein each of the RTS frame, the CTS frame, the data frame, and the acknowledgment frame includes a duration field having a time value that is used to set a Network Allocation Vector at a network station and causing the network station to refrain from transmitting data for a time duration equal to the time value.

7. The method of claim 6, wherein the time value extends through the end of the acknowledgment frame.

8. A method of receiving data frames transmitted in the wireless network comprising:
receiving at a first station a request-to-send (RTS) frame from a transmitting station, wherein the RTS frame has a first potency and wherein the first potency is determinable, based at least in part on, a first bit rate and a first radiated power level
transmitting from the first station a clear-to-send (CTS) frame in response to the RTS frame and the availability of the media channel, wherein the CTS frame is transmitted at a second potency determinable, based at least in part on, a second bit rate and a second radiated power level;
receiving at the first station a data frame as a response to the CTS frame, wherein the data frame has a third potency determinable, based at least in part on, a third bit rate and a third radiated power level; and
transmitting from the first station an acknowledgment frame in response to the data frame, wherein the acknowledge frame has a fourth potency determinable, based at least in art on, a fourth bit rate and a fourth radiated power level,
wherein at least one of the first potency, the second potency, and the fourth potency is greater than the third potency, and
wherein the third bit rate is greater than at least one of the first bit rate and the second bit rate.

9. The method of claim 8, wherein each of the RTS frame, the CTS frame, the data frame, and the acknowledgment frame includes a duration field having a time value that extends through the end of the acknowledgment frame.

10. The method of claim 9, further comprising;
using the time value to set a Network Allocation Vector; and
refraining from transmitting data for at least a time period equal to the time value.

11. The method of claim 9, further comprising:
determining a network station is not a destination of the data frame; and
causing the network station to refrain from transmitting data for at least a time period equal to the time value.

12. The method of claim 8, wherein only the first potency is greater than the third potency and wherein the RTS frame is transmitted to every network station.

13. The method of claim 8, wherein only the second potency is greater than the third potency and wherein the CTS frame is transmitted to every network station.

14. The method of claim 8, wherein only the fourth potency is greater than the third potency and wherein the acknowledgment frame is transmitted to every network station.

15. A system for transmitting data frames in a wireless network comprising:
a transmitter configured to determine a first potency, based at least in part on, at least a first bit rate and a first radiated power level and to transmit a request-to-send (RTS) frame at the first potency; and
a receiver configured to receive a clear-to-send (CTS) frame at a second potency, wherein the CTS frame is a response to the RTS frame and wherein the second potency is determinable, based at least in part on, a second bit rate and a second radiated power level,
wherein the transmitter is further configured to determine a third potency, based at least in part on, a third bit rate and a third radiated power level and to transmit in response to the CTS frame at least one data frame at the third potency,
wherein the third potency is less than at least one of the first potency and the second potency, and
wherein the third bit rate is greater than at least one of the first bit rate and the second bit rate.

16. The system of claim 15, wherein the receiver is configured to receive at least one acknowledgment frame at a fourth potency determinable, based at least in part on, a fourth bit rate and a fourth radiated power level, and wherein each of the at least one acknowledgment frame is a response to each of the at least one data frame.

17. The system of claim 15, further comprising a host interface for receiving data and instructions from a host computer.

18. The system of claim 15, further comprising a processor for converting data received from a host computer into one or more data frames for transmitting onto a shared-communications channel.

19. The system of claim 15, further comprising a memory for storing data and instructions received from a host computer.

20. A system for receiving data frames in a wireless network comprising:
a receiver for receiving a request-to-send (RTS) frame at a first potency, wherein the first potency is determinable, based at least in part on, a first bit rate and a first radiated power level; and
a transmitter for determining a second potency, based at least in part on, a second bit rate and a second radiated power level and for transmitting in response to the RTS frame a clear-to-send (CTS) frame at the second potency,
wherein the receiver is further configured to receive at least one data frame at a third potency, wherein the third potency is determinable, based at least in part on, a third bit rate and a third radiated power level,
wherein the third potency is less than at least one of the first potency and the second potency, and
wherein the third bit rate is greater than at least one of the first bit rate and the second bit rate.

21. The system of claim 20, wherein the transmitter is configured to determine a fourth potency, based at least in part on, one of a fourth bit rate and a fourth coding rate and to transmit in response to the one or more data frame at least one acknowledgment frame at the fourth potency.

22. The system of claim 21, wherein at least one of the first potency, the second potency, and the fourth potency is greater than the third potency.

23. The system of claim 20, further comprising a host interface for receiving instructions from a host computer and for transmitting data to the host computer.

24. The system of claim 20, further comprising a processor for converting one or more data frames to data, wherein the one or more data frames are received via a shared-communications channel.

25. The system of claim 20, further comprising a memory for storing data and instructions.

* * * * *